(12) United States Patent
Eguro (10) Patent No.: US 7,885,007 B2
(45) Date of Patent: Feb. 8, 2011

(54) OPTICAL ELEMENT AND PRODUCING METHOD

(75) Inventor: Yayoi Eguro, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 386 days.

(21) Appl. No.: 12/169,455

(22) Filed: Jul. 8, 2008

(65) Prior Publication Data

US 2009/0016199 A1    Jan. 15, 2009

(30) Foreign Application Priority Data

Jul. 11, 2007   (JP) .............................. 2007-182078

(51) Int. Cl.
G02B 11/00       (2006.01)
(52) U.S. Cl. ................. 359/642; 359/719; 369/112.08; 369/112.13; 369/112.2; 264/1.1; 264/1.32
(58) Field of Classification Search ................ 359/642, 359/719; 369/112.08, 112.13, 112.12; 264/1.1, 264/1.32

See application file for complete search history.

(56) References Cited

U.S. PATENT DOCUMENTS 7,072,118 B2 *   7/2006   Kojima ....................... 359/642

FOREIGN PATENT DOCUMENTS

| JP | 9-109165 | 4/1997 |
|---|---|---|
| JP | 3055443 | 4/2000 |
| JP | 2005-275393 | 10/2005 |

* cited by examiner

Primary Examiner—Joseph Martinez
(74) Attorney, Agent, or Firm—Finnegan, Henderson, Farabow, Garrett & Dunner, L.L.P.

(57) ABSTRACT

An optical element includes: an element body including a resin containing a polymer having an alicyclic structure. The optical element is treated by one of heat treatment and wet-heat treatment for 15 hours or longer at a temperature lower by 10° C. to 30° C. than a glass transition temperature of the resin after being formed by injecting the resin in a mold. The optical element body has a length along an optical axis of the optical element in a range of 0.5 to 3 mm, and a length in a perpendicular direction to the optical axis in a range of 3 to 5 mm.

15 Claims, 2 Drawing Sheets

OPTICAL ELEMENT AND PRODUCING METHOD

This application is based on Japanese Patent Application No. 2007-182078 filed on Jul. 11, 2007, in Japanese Patent Office, the entire content of which is hereby incorporated by reference.

TECHNICAL FIELD

The present invention relates to a small sized optical element to be used for an element such as an optical pickup lens of an optical pickup apparatus.

BACKGROUND

Recently, various sized optical elements from large sized ones such as those to be use for telescopes and microscopes to small sized ones such as those to be used for optical pickup lens for compact disc (CD), digital video disc (DVD), high density DVD (HD-DVD) and Blu-ray Disc (BD) are produced and on the market.

Such the elements are molded by ejecting a resin specified for the use into a designated metal mold, so called an ejection mold method. In such the case, double refraction causes on the surface layer of the molded product by remaining stress and scattering of light occurs in the surface layer so that the focal distance of the product is difficultly adjusted to the required designed value.

It is disclosed that the double refraction caused in the product can be minimized by relaxing the remaining stress in the molded product by annealing the product after cooled at a temperature lower than the glass transition temperature; cf. JP-B No. 3055443, for example.

Moreover, a method is known in which a resin containing a polymer having an alicyclic structure is molded by ejecting into a metal mold and the molded resin is treated by heat treatment or wet-heat treatment for 16 or more hours at a temperature lower by 35 to 45° C. than the glass transition temperature of the resin; cf. JP-A No. 2005-275393, for example.

However, the technique described in JP-B No. 3055443 is a method for providing the annealing treatment on the occasion of molding of a relatively large optical element for giving suitable properties to the molded product. It specifies the annealing conditions in detail, but the conditions is hardly applied for entire resin optical elements produced by the ejection molding process. For instance, in the case of small sized optical elements having a size of several millimeters to be used for the optical pickup lens, the light-spot forming ability is largely influenced by the difference in the annealing condition when the annealing condition is slightly different by every production lot.

Therefore, the remaining stress cannot be sufficiently relaxed and the thermal equilibrium condition cannot be stably kept during the annealing treatment by the annealing treatment so that the sufficient properties as the optical element for the optical pickup lens is hardly obtained by the technique disclosed in JP-B No. 3055443.

In the technique disclosed in JP-A No. 2005-275393, the annealing conditions for sufficiently relaxing the remaining stress in the small sized optical element and greatly improving the optical properties such as astigmatism are minutely specified. However, an optical element having flat-plate like shape or an optical element thinned and small sized in diameter such as that for HD-DVD is easily deformed by heat and a high NA optical element such as for BD is very sensitive so that the optical property thereof is easily influenced by slight deformation. Therefore, the conditions described are not entirely corresponded to the properties of such the optical elements.

SUMMARY

An object of the invention is an optical element suitably applied to the small sized optical element such as the optical pickup lens and a producing method thereof, and is to provide an optical element in which the remaining stress is sufficiently relaxed and the optical properties such as astigmatism is largely improved and a producing method thereof.

One of embodiments of the present invention is an optical element including: an element body comprising a resin containing a polymer having an alicyclic structure. The element body is treated by one of heat treatment and wet-heat treatment for 15 hours or longer at a temperature lower by 10° C. to 30° C. than a glass transition temperature of the resin after being formed by injecting the resin in a mold. Where, the glass transition temperature of the resin is measured by differential-scanning-calorimetry-method at heating rate 10° C./min on the basis of JIS K7121. The optical element has a length along an optical axis of the optical element in a range of 0.5 to 3 mm, and has a length in a perpendicular direction to the optical axis in a range of 3 to 5 mm.

Another embodiment of the present invention is a method of producing the above optical element. The method includes molding a resin containing a polymer having an alicyclic structure to form an element body having a length along an optical axis of the optical element in a range of 0.5 to 3 mm and a length long a perpendicular direction to the optical axis in a range of 3 to 5 mm by injecting the resin in a mold. The method further includes thereafter treating the element body by one of heat treatment and wet-heat treatment for 15 hours or longer at a temperature lower by 10° C. to 30° C. than a glass transition temperature of the resin. Here, the glass transition temperature of the resin is measured by differential-scanning-calorimetry-method at heating rate 10° C./min on the basis of JIS K7121.

In the optical element, the remaining stress is sufficiently relaxed and the optical properties such as astigmatism are considerably improved since the resin composed of the polymer having alicyclic structure is molded by ejecting into a metal mold and then subjected to a heat treatment or wet-heat treatment, hereinafter referred to as anneal or anneal treatment, for 15 or more hours at a temperature lower by 10 to 30° C. than the glass transition temperature, which is a temperature measured by a differential-scanning-calorimetry-method at heating rate of 10° C./min according to JIS K7121.

In the producing method of optical element, the optical element in which the remaining stress is sufficiently relaxed and the optical properties such as astigmatism are considerably improved can be obtained since the resin composed of the polymer having alicyclic structure is molded by ejecting into a metal mold and then subjected to a heat treatment or wet-heat treatment for 15 or more hours at a temperature lower by 10 to 30° C. than the glass transition temperature thereof, which is a temperature measured by a differential scanning calorimetric analysis at a temperature raising rate of 10° C./min according to JIS K7121.

These and other objects, features and advantages according to the present invention will become more apparent upon reading of the following detailed description along with the accompanied drawings.

BRIEF DESCRIPTION OF THE DRAWINGS

Embodiments will now be described, by way of example only, with reference to the accompanying drawings which are meant to be exemplary, not limiting, and wherein like elements numbered alike in several Figures, in which.

DESCRIPTION OF THE PREFERRED EMBODIMENT

The best mode for embodying the invention is described below referring the drawings but the invention is not limited to the drawn examples.

Figure 1:
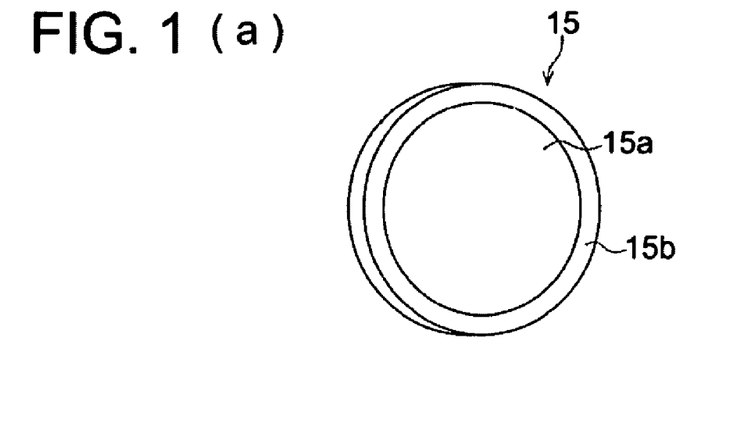
FIGS. 1(a) and 1(b) show a perspective view and a cross section of the schematic constitution of an optical element for an optical pickup apparatus.
FIG. 1(c) shows a cross section of the schematic constitution of another optical element for an optical pickup apparatus.

Each of FIGS. 1(a)-1(c) shows an example of preferable embodiment of the invention of optical element. FIG. 1(a) is a perspective view of an objective lens 15 and FIG. 1(b) is a cross section of the objective lens 15. As is shown in FIGS. 1(a) and 1(b), the optical element 15 has an optical functional part 15a and a ring-shaped flange 15b supporting the circumstance portion of the optical functional part 15a and the optical functional parts 15a and the flange 15b are molded as one body. Further, an optical element for an optical pickup apparatus of the preferred embodiment can be a lens or a correcting optical element each having a relatively small numerical aperture and having a flat-plate-like shape, compared with the objective lens.

The optical element 15 has a length d in the optical axis direction in a range from 0.5 to 3 mm and a length l in the perpendicular direction to the optical axis direction in a range from 3 to 5 mm. The optical element 15 is molded by ejecting the resin composed of the polymer having alicyclic structure into a metal mold and then subjected to a heat treatment or wet-heat treatment for 15 hours or longer at a temperature lower by 10 to 30° C. than the glass transition temperature of the resin. Here, the temperature is measured by the differential-scanning-calorimetry-method at a heating rate of 10° C./min on the basis of JIS K7121.

The resin composed of the polymer having alicyclic structure preferably comprises polymer block [A] containing a repeating unit [1] represented by a Formula 1, and polymer block [B] containing the repeating unit [1] represented by the Formula 1 and a repeating unit [2] represented by the Formula 2, and/or a repeating unit [3] represented by the Formula 3. The block polymers preferably satisfy a relationship of a>b, where a is a mol fraction (mol %) of the repeating unit [1] in the polymer block [A] and b is a mol fraction (mol %) of the repeating unit [1] in the polymer block [B].

Formula 1

In the Formula 1, $R^1$ represents a hydrogen atom or an alkyl group having a carbon number of 1-20, $R^2$-$R^{11}$ each independently represent a hydrogen atom, an alkyl group having a carbon number of 1-20, hydroxyl group, an alkoxy group having a carbon number of 1-20 or a halogen group.

Formula 2

In the Formula 2, $R^{12}$ represents a hydrogen atom or a alkyl group having a carbon number of 1-20.

Formula 3

In the Formula 3, $R^{13}$ and $R^{14}$ each independently represent a hydrogen atom or a alkyl group having a carbon number of 1-20.

When the length of the element body of the optical element in the light axis direction is 0.7 to 1.5 mm, the element body is preferably treated by one of the heat treatment and the wet-heat treatment for 15 hours or longer at a temperature lower by 20-30° C. than the glass transition temperature (which is the glass transition temperature of the resin is measured by differential-scanning-calorimetry-method at heating rate).

When the length of the element body of the optical element in the light axis direction is 1.6 to 2.5 mm, the element body is preferably treated by one of the heat treatment and the wet-heat treatment for 15 hours or longer at a temperature lower by 10-15° C. than the glass transition temperature of the resin (the glass transition temperature of the resin is measured by differential-scanning-calorimetry-method at heating rate).

Figure 2:
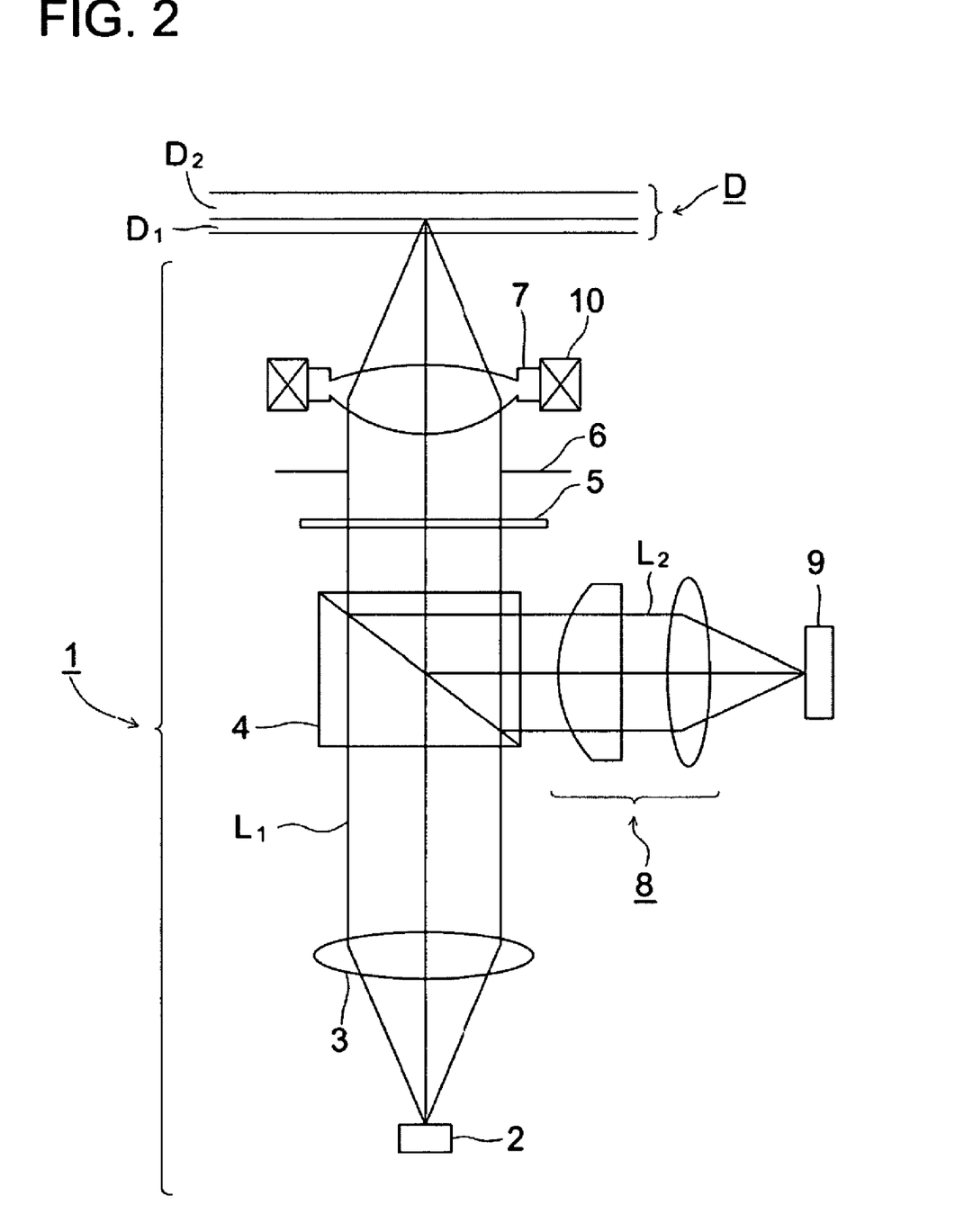
FIG. 2 shows an example of a schematic view of an optical pickup apparatus and an optical element used as an objective lens.

FIG. 2 shows an example of a schematic view of an optical pickup apparatus and an optical element used as an objective lens. The optical element relating to the present invention is preferably used in an optical pickup apparatus as shown in FIG. 2.

Optical pickup apparatus 1 of the present embodiment includes a semiconductor laser oscillator 2 representing a light source as shown in FIG. 2. The semiconductor laser oscillator 2 emits violet light. On the optical axis of the violet light, there are provided collimating lens 3, beam splitter 4, quarter wavelength plate 5, and objective lens 7, in this order in a direction that the light travels away from the semiconductor laser oscillator.

There is further provided sensor lens group 8 composed of two lenses, and sensor 9 at a close position to the beam splitter 4 in this order along a perpendicular direction to the optical axis of the violet light.

In the optical pickup apparatus, there is arranged the objective lens 7 representing an optical element with facing optical disc D. The objective lens 7 converges the violet light emitted from the semiconductor laser oscillator onto a surface of the optical disc D. This objective lens 7 includes two-dimensional actuator 10. The objective lens 7 freely moves along the optical axis by a movement of the two-dimensional actuator 10.

Action of the optical pickup apparatus 1 will be disclosed below.

In the optical pickup apparatus 1 of the present embodiment, the semiconductor laser oscillator emits violet light when information is recorded for the optical disc D and when information recorded on the optical disc D is reproduced. The emitted violet light becomes a light flux $L_1$ as shown in FIG. 2 and passes through the collimating lens 3 to be collimated into an infinite parallel light flux. Then, the light flux passes the beam splitter 4 and the quarter wavelength plate 5. The light flux further passes diaphragm 6 and the objective lens 7 and is formed into a converged spot on information recording surface $D_2$ through the protective substrate $D_1$ of the optical disc D.

The light formed into the converged light is modulated by information pits on the information recording surface $D_2$ of the optical disc D. The modulated light is reflected by the information recording surface $D_2$. The reflected light passes the objective lens 7 and diaphragm 6 in this order and is changed in polarizing direction by the quarter wavelength plate 5. The light is reflected by the beam splitter 4, then, passes the sensor lens group 8 with being provided astigmatism. The light flux is received by the sensor 9, and finally becomes electric signal by photoelectrically converted by the sensor 9.

After the similar operations are repeated, information recording for the optical disc D or reproducing of information recorded on the optical disc D is completed.

In this action, numerical aperture NA required to the objective lens 7 depends on a thickness of the protective substrate $D_1$ and size of information pits of the optical disc D. In the present embodiment, the optical disc D is a high-density optical disc and its numerical aperture is set to 0.85.

An optical element for an optical pickup apparatus of the present embodiment can be, for example, a lens such as a collimating lens and an objective lens, a beam shaper, a prism, a diffraction grating optical element (such as diffractive lens, diffractive prism, diffractive plate, and chromatic aberration correcting element), an optical filter (such as, a spatial low-pass filter, wavelength bandpass filer, wavelength highpass filter), a polarizing filter (such as, an analyzer, azimuth rotator, and polarization dividing prism), a phase filter (such as, a phase plate and a hologram). However, the optical element is not limited to these examples. Especially, an objective lens having a large converging property and makes the intensity of the emitting light larger than that of the entering light, is preferable in these optical elements.

A functional film in the embodiment is not limited and include an antireflection film, antistatic film, antifouling film, anti-crack film (hard coat film) each formed on the optical element of the conventional optical pickup apparatus.

The optical element of the embodiment (the objective lens 7 for example) is constituted by the resin composed of the polymer having alicyclic structure, preferably the resin composed of the polymer including the polymer block [A] containing the repeating unit [1] represented by the foregoing Formula 1 and the polymer block [B] containing the repeating unit [1] represented by Formula 1, the repeating unit represented by Formula 2 and/or the repeating unit [3] represented by Formula 3, in which the relation of the mole ratio a (mole %) of the repeating unit [1] in the polymer block [A] and the mole ratio b (mole %) of the repeating unit [1] in the polymer block [B] is a>b. The resin is ejected into the metal mold and cooled by room temperature to be molded and subjected to the heating treatment or wet-heating treatment for 15 hours or longer at a temperature lower by 10 to 30° C. than the glass transition temperature of the resin. Here, the glass transition temperature of the resin is measured by differential-scanning-calorimetry-method at heating rate 10° C./min on the basis of JIS K7121.

In the heating or the wet-heating treatment, the time is preferably 150 hours or more and the relative humidity for wet-heat treatment is preferably from 40 to 80% and more preferably from 55 to 65%.

In the embodiment, the "resin composed of polymer having alicyclic structure" is preferably contains the block polymer which is constituted by the polymer block [A] containing the repeating unit [1] represented by the foregoing Formula 1 and the polymer block [B] containing the repeating unit [1] represented by Formula 1, the repeating unit represented by Formula 2 and/or the repeating unit [3] represented by Formula 3. The relation of the mole ratio a (mole %) of the repeating unit [1] in the polymer block [A] and the mole ratio b (mole %) of the repeating unit [1] in the polymer block [B] is preferably a>b. Concretely, ZEONEX 340R, manufactured by Nihon Zeon Corp., is cited as its example.

The preferable repeating unit [1] represented by a Formula 1 has a structure in which $R^1$ represents a hydrogen atom or a methyl group, and, $R^2$-$R^{11}$ each represent a hydrogen atom. When the content of the repeating unit [1] in the polymer block [A] is in the pre-described condition, the transparency and mechanical strength are made superior. The remaining part other than the repeating unit [1] is a hydrogenated repeating unit derived from a chain conjugated diene or a chain vinyl compound.

The polymer block [B] contains the repeating unit [1] represented by the Formula 1 and a repeating unit [2] represented by the Formula 2, and/or a repeating unit [3] represented by the formula 3. The content of the repeating unit [1] in the polymer block [B] is preferably from 40 to 95 mole % and more preferably from 50 to 90 mole %. When the content of the repeating unit 1 is within the pre-described condition, the transparency and mechanical strength are made superior. When the mole ratio of the repeating unit [2] and that of the repeating unit [3] in the polymer block [B] are each m2 (mole %) and m3 (mole %), respectively, 2×m2+m3 is preferably not less than 2 mole %, more preferably from 5 to 60 mole %, and most preferably from 10 to 50 mole %.

In a preferable structure of the repeating unit [2] represented by Formula 2, $R^{12}$ is a hydrogen atom or a methyl group. In a preferable structure of the repeating unit [3] represented by Formula 3, $R^{13}$ is a hydrogen atom, a methyl group or an ethyl group.

When the content of the repeating unit [2] or [3] in the polymer block [B] is too low, the mechanical strength can be lowered. Therefore, it is preferable that the contents of the repeating unit 2 and the repeating unit [3] are within the above range, because the transparence and the mechanical strength are made superior. The polymer block [B] may further contain the repeating unit [X] represented by the following Formula X. The content of the repeating unit [X] is to be within the range in which the properties of the block copolymer of the embodiment is not vitiated and preferably not more than 30 mole % and more preferably not more than 20 mol % to whole of the block copolymer.

Formula X

In Formula X, $R^{25}$ is a hydrogen atom or an alkyl group having 1 to 20 carbon atoms, $R^{26}$ is a nitro group, an alkoxycarbonyl group, a formyl group, a hydroxycarbonyl group or a halogen group, and $R^{27}$ is a hydrogen atom. $R^{26}$ and $R^{27}$ may be bonded with together to form an acid anhydride or an imido group.

In the block copolymer to be used in the embodiment, the mole ratio a of the repeating unit [1] in the polymer block [A] and that b of the repeating unit [1] in the polymer block [B] preferably satisfy the relation of a>b. The transparency and mechanical strength are improved by such the condition.

When the mole number of the whole repeating units constituting the block [A] is ma and that of the whole repeating units constituting the block [B] is mb, the ratio of ma:mb is preferably from 5:95 to 95:5, more preferably from 30:70 to 95:5, and particularly preferably from 40:60 to 90:10. The transparency and mechanical strength are made superior when the ratio of ma:mb is within the above range.

The molecular weight of the block copolymer to be used in the embodiment is preferably from 10,000 to 300,000, more preferably from 15,000 to 250,000, and particularly preferably from 20,000 to 200,000 in terms of weight average molecular weight, hereinafter referred to as Mw, of polystyrene (or polyisoprene) measured by gel permeation chromatography, hereinafter referred to as GPC, using tetrahydrofuran as the solvent.

The product superior in the mechanical strength, thermal resistivity and molding suitability can be obtained when the Mw of the block polymer is within the above range. The molecular weight distribution of the block copolymer represented by the ratio (Mw/Mn) of the Mw in terms of polystyrene (or polyisoprene) to the number average, hereinafter referred to as Mn, is preferably not more than 5, more preferably not more than 4, and particularly preferably not more than 3 though the molecular weight distribution may be suitably selected according to the purpose of use. The product superior in the mechanical strength and heat resistivity can be obtained when the Mw/Mn is within the above range.

The glass transition temperature, hereinafter referred to as Tg, of the block copolymer may be suitably elected according to the purpose of use, and is preferably from 70 to 200° C., more preferably from 80 to 180° C., and particularly preferably from 90 to 160° C., in terms of the measured value on the high temperature side by the differential scanning calorimeter, hereinafter referred to as DSC.

The block copolymer to be used in the embodiment may have the polymer blocks [A] and [B]. The block copolymer may be ([A]-[B]) type copolymer, a tri-block copolymer such as ([A]-[B]-[A]) or ([B]-[A]-[B]) or a copolymer in which four or more the polymer blocks [A] and [B] in total are alternatively linked. A block copolymer formed by radially combining of such the blocks is also allowable.

The block copolymer to be used in the embodiment can be obtained by the following method. Such the method is a method in which a monomer mixture of an aromatic vinyl compound and/or a alicyclic vinyl compound having an unsaturated bond in the ring thereof and a monomer mixture containing a vinyl monomer other than the aromatic vinyl compound and the alicyclic vinyl compound are polymerized to obtain the block copolymer including the polymer block containing the repeating unit derived from the aromatic vinyl compound and/or the alicyclic vinyl compound and the polymer block containing the repeating unit derived from the vinyl monomer and then the aromatic ring and/or alicyclic ring of thus obtained block copolymer are hydrogenated, and a method in which a monomer mixture containing the a saturated alicyclic vinyl compound or a monomer mixture containing a vinyl monomer other than the aromatic vinyl compound and the alicyclic vinyl compound are polymerized to obtained the block copolymer including the polymer block containing the repeating unit derived from the alicyclic vinyl compound and the polymer block containing the repeating unit derived from the vinyl monomer. Among them, one of the block copolymer more preferably to be used in the embodiment is produced by the following methods for example.

(1) As a first method, a monomer mixture [a'] containing not less than 50 mole % of the aromatic vinyl compound and/or the alicyclic vinyl compound having an unsaturated bond in the ring thereof is polymerized to obtain a polymer block [A'] which contains repeating units derived from the aromatic vinyl compound and/or the alicyclic vinyl compound.

A monomer mixture [b'] containing not less than 2 mole % of the vinyl type monomer other than the aromatic vinyl compound and the alicyclic vinyl compound and the aromatic compound and/or the alicyclic compound having an unsaturated bond in the ring thereof in a ratio of less than that in the monomer mixture [a'] is polymerized to obtain a polymer block [B'] containing the repeating units derived from the aromatic vinyl compound and/or the alicyclic vinyl compound and the repeating units derived from the vinyl type monomer.

A block copolymer containing the polymer blocks [A'] and [B'] is obtained by the above processes and the aromatic ring and/or the alicyclic ring of the block copolymer are hydrogenized.

(2) As a second method, a monomer mixture a containing 50 mole % or more of the saturated alicyclic vinyl compound is polymerized to obtain the polymer block [A] containing the repeating units derived from the saturated alicyclic vinyl compound. A monomer mixture [b] containing not less than 2 mole % of the vinyl type monomer other than the aromatic vinyl compound and the alicyclic vinyl compound and the saturated alicyclic vinyl compound in a ratio of less than that in the monomer mixture a is polymerized to obtain the polymer block [B] containing the repeating units derived from the saturated alicyclic vinyl compound and the repeating units derived from the vinyl type monomer.

A block copolymer containing the polymer blocks [A] and [B] is obtained through the above processes.

Among the above methods, the method (1) is preferable from the viewpoint of availability of the monomer, yield of polymerization and easiness of introducing the repeating unit [1] to the polymer block [B'].

As the concrete example of the aromatic vinyl compound produced by the first method, styrene, α-methylstyrene, α-ethylstyrene, α-propylstyrene, α-isopropylstyrene, α-t- butylstyrene, 2-methylstyrene, 3-methylstyrene, 4-methylstyrene, 2,4-diisopropylstyrene, 2,4-dimethylstyrene, 4-t-butylstyrene, 5-t-butyl-2-methylstyrene, monochlrostyrene, dichlorostyrene, monofluorostyrene, 4-phenylstyrene and their derivatives having a substituent such as a hydroxyl group and alkoxyl group are cited. Among them, styrene, 2-methylstyrene, 3-methylstyrene and 4-methylstyrene are preferable.

Concrete examples of the unsaturated alicyclic vinyl compound produced by the first method include cyclohexenylethylene, α-methylcyclohexenyl-ethylene, α-t-butylcyclohexenylethylene and their derivative having a substituent such as a halogen atom, an alkoxy group and a hydroxyl group.

These aromatic vinyl compounds and the alicyclic vinyl compounds may be used solely or in combination of two kinds of them. It is preferable in the embodiment that the aromatic vinyl compound is used in both of the monomer mixtures of [a'] and [b'] and styrene or α-methylstyrene is preferably used among them.

The vinyl type monomer to be used in the above method includes a chain vinyl compound and a chain conjugated diene compound.

As concrete example of the chain vinyl compound, a chain olefin monomer such as ethylene, propylene, 1-butene, 1-pentene and 4-methyl-1-pentene is cited. Among them, the chain olefin monomer is preferable and ethylene, propylene and 1-butene are most preferable. As the chain conjugated diene, 1,3-butadiene, isoprene, 2,3-dimethyl-1,3-butadiene, 1,3-pentadiene and 1,3-hexadiene are cited for instance.

Among the chain vinyl compound and the chain conjugated diene, the chain conjugated diene is preferable and butadiene and isoprene are particularly preferable. These chain vinyl compounds and the chain conjugated diene compounds may be used solely or in combination of two or more kinds of them.

Any method such as radical polymerization, anion polymerization and cation polymerization may be applied for polymerization of the monomer mixture containing the above monomers and the anion polymerization is preferable and anion living polymerization in the presence of an inactive solvent is most preferable.

The anion polymerization is carried usually out within the range of from 0 to 200° C., preferably from 20 to 100° C., and particularly preferably from 20 to 80° C. in the presence of a polymerization initiator. As the polymerization initiator, a mono-organic lithium compound such as n-butyllithium, sec-butyllithium, t-butyllithium and hexyllithium, and a polyfunctional organic lithium compound such as phenyllithium, dilithiomethane and 1,4-diobutane,1,4-dilithio-2-ethylcyclohexane are usable.

Examples of the usable inactive solvent include an aliphatic hydrocarbon such as n-butane, n-pentane, isopentane, n-hexane, n-heptane and isooctane; an alicyclic hydrocarbon such as cyclopentene, cyclohexane, methylcyclopentane, methylcyclohexane and decaline; and an aromatic hydrocarbon such as benzene and toluene. Among them, the aliphatic hydrocarbon and the alicyclic hydrocarbon can be still used as the solvent inactive to the hydrogenation reaction. These solvent can be used solely or in combination of two or more kinds thereof and is usually used in a ratio of from 200 to 10,000 parts by weight to 100 parts by weight of the whole monomer to be used.

A polymerization accelerator or a randomizer may be used on the occasion of polymerizing the polymer blocks for preventing the formation of long chain of the same kind of the polymer block in each of the blocks. Particularly, a Lewis base compound can be used as the randomizer when the polymerization reaction is carried out by the anion polymerization.

As the concrete example of the Lewis base compound, an ether compound such as dimethyl ether, diethyl ether, diisopropyl ether, dibutyl ether, tetrahydrofuran, diphenyl ether, ethyleneglycol diethyl ether and ethyleneglycol methyl-phenyl ether; a tertiary amine compound such as tetramethylethylenediamine, trimethylamine, triethylamine and pyridine; an alkali metal alkoxide compound such as potassium-t-amyloxide and potassium-t-butylaoxide: and a phosphine compound such as triphenylphosphine are cited. These Lewis base compounds can be use solely or in combination of two or more kinds thereof.

A know successive additional polymerization reaction method and a coupling method are applicable for forming the block copolymer by the living anion polymerization. In this embodiment, the successive additional polymerization reaction method is preferably applied.

When the block copolymer having the polymer blocks [A'] and [B'] is produced by the successive additional reaction, the process for forming the polymer block [A'] and the process for forming the polymer block [B'] are successively and continuously carried out.

In concrete, the polymer block [A'] is obtained by polymerizing the monomer mixture [a'] in the inactive solvent in the presence of the living anion polymerization catalyst and then the monomer mixture b' is added to the reaction system and polymerization is continued to obtain a polymer block [B'] bonded with the polymer block [A']. Moreover, the monomer mixture a' is added according to necessity and polymerized to bond a polymer block [A'] for forming a triblock polymer and then the monomer mixture [b'] is further added and polymerized for bonding a polymer block [B'] to form a terablock polymer.

Thus obtained block copolymer is recovered by a known method such as a steam stripping method, a direct solvent removing method and an alcohol coagulation method. When the inactive solvent for the hydrogenation reaction is used in the polymerization reaction, the recovery of the block copolymer is not necessary because the polymer solution can be still used for the hydrogenation reaction.

Among the block copolymers each having the polymer block [A'] and the polymer block [B'] obtained by the above method (1), hereinafter referred to as pre-hydrogenation block copolymer, ones having the following repeating unit are preferred.

The polymer block [A'] constituting the preferable pre-hydrogenation block copolymer is a polymer block containing the repeating unit [4] represented by the following Formula 4 in a ratio of 50 mole %.

Formula 4

In Formula 4, $R^{16}$ is a hydrogen atom, an alkyl group having 1 to 20 carbon atoms, $R^{17}$ to $R^{21}$ are each indepen- dently a hydrogen atom, an alkyl group having 1 to 20 carbon atoms, a hydroxyl group, an alkoxy group having 1 to 20 carbon atoms or a halogen group.

Preferable polymer block [B'] is a polymer block which necessarily contains the repeating unit [4] and at least one of the repeating unit [5] represented by the following Formula 5 and the repeating unit [6] represented by the following Formula 6. When mole ratio of the repeating unit [4] in the polymer block [A'] is a' and that of the repeating unit [4] in the polymer block [B'] is b', the relation of a' and b' is a'>b'.

Formula 5

In Formula 5, $R^{22}$ is a hydrogen atom or an alkyl group having 1 to 20 carbon atoms.

Formula 6

In Formula 6, $R^{23}$ is a hydrogen atom or an alkyl group having 1 to 20 carbon atoms and $R^{24}$ is a hydrogen atom or an alkyl group or an alkenyl group each having 1 to 20 carbon atoms.

Moreover, the block [B'] may contain a repeating unit [Y] represented by the following Formula Y.

Formula Y

In Formula Y, $R^{28}$ is a hydrogen atom or an alkyl group having 1 to 20 carbon atoms, $R^{29}$ is a nitrile group, an alkoxycarbonyl group, a formyl group, a hydroxycarbonyl group or a halogen group, and $R^{30}$ is a hydrogen atom. $R^{29}$ and $R^{30}$ may be bonded with together for forming an acid anhydride or an imido group.

In the preferable pre-hydrogenation block copolymer, the ratio of ma':mb' is from 5:95 to 95:5, more preferably from 30:70 to 95:5, and particularly preferably from 40:60 to 90:10 when the mole number of the whole repeating units constituting the block [A'] is ma' and that of the whole repeating unit constituting the block [B'] is mb'. The mechanical strength and the thermal resistivity are made superior when the ratio of ma':mb' is within the above range.

The molecular weight of the preferable pre-hydrogenation block copolymer is from 12,000 to 400,000, more preferably from 19,000 to 350,000, and particularly preferably from 25,000 to 300,000 in terms of Mw of polystyrene (or polyisoprene) measured by GPC using THF as the solvent. The mechanical strength is lowered when the Mw of block copolymer is too low, and the hydrogen adding ratio is lowered when the Mw is too high.

The molecular weight distribution of the pre-hydrogenation can be suitably selected according to the purpose of use and the ratio of Mw to Mn (Mw/Mn) in terms of Mw and Mn of polystyrene (or polyisoprene) measured by GPC is preferably not more than 5, more preferably not more than 4, and particularly preferably not more than 3. The hydrogen adding ratio is raised when the Mw/Mn is within the above ratio.

The Tg of the preferable pre-hydrogenation block copolymer may be suitably selected according to the purpose of the use, and the value on the high temperature side measured by DSC is preferably from 70 to 150° C., more preferably from 80 to 140° C., and particularly preferably from 90 to 130° C.

There is no limitation on the method and the type of reaction for hydrogenating the carbon-carbon unsaturated bond of the aromatic ring or cycloalkene ring and the unsaturated bond on the main chain or side chain of the pre-hydrogenation block copolymer, and the reaction may be carried out by a know method. A method capable of raising the hydrogenation ratio with inhibited polymer chain cleaving reaction is preferable and that reaction is carried out in an organic solvent using a catalyst containing at least one kind of metal selected from nickel, cobalt, iron, titanium, rhodium, palladium, platinum, ruthenium and rhenium for example. As the hydrogenation catalyst, both of an ununiform type catalyst and a uniform type catalyst are usable.

The ununiform type catalyst can be used in a state of metal compound it self or carrying on a suitable carrier. As the carrier, active carbon, silica, alumina, calcium carbide, titania, magnesia, zirconia, diatomite and silicon carbide are cited for example. The carrying amount of the catalyst is preferably form 0.01 to 80%, and more preferably from 0.05 to 60%, by weight.

As the uniform type catalyst, ones composed of a combination of a compound of nickel, cobalt, titanium or iron and an organic metal compound such as organic aluminum compound and an organic lithium compound, or an organic metal complex catalyst such as that of rhodium, palladium, platinum, ruthenium and rhenium are usable. As the compound of nickel, cobalt, titanium or iron, acetyl acetone salt, naphthate, cyclopentadienyl compound or cyclopentanedienyldichloro compound of each of the metals are usable. As the organic aluminum compound, an alkyl aluminum such as triethylaluminum and triisobutylaluminum, an aluminum halide such as diethylaluminum chloride and ethylaluminum dichloride and a hydrogenated alkylaluminum such as diisobutylaluminum halide are suitably usable.

As example of the organic metal complex, complexes of the above metals such as a γ-dichloro-π-benzene complex, a dichloro-tris(triphenylphosphine) complex and a hydride-chloro-triphenylphosphine complex are used. These hydrogenation catalyst can be used solely or in combination of two or more kinds of them, and the using amount of it is preferably from 0.01 to 100, more preferably from 0.05 to 50, and particularly preferably from 0.1 to 30, parts by weight to 100 parts by weight of the polymer.

The hydrogenation reaction is usually carried out at a temperature of from 10 to 250° C., and a temperature of from 50 to 200° C. is preferable and that from 80 to 180° C. is more preferable for raising the hydrogenation ratio and inhibiting the polymer cleaving reaction. The pressure of hydrogen is preferably from 0.1 to 30 MPa and more preferably from 1 to 20 MPa and particularly preferably from 2 to 10 MPa from the viewpoint of the above and the operation suitability.

The hydrogenation ratio of thus obtained block copolymer at the carbon-carbon unsaturated bond of the main chain and the side chain and the carbon-carbon unsaturated bond of the aromatic ring or cycloalkene ring is preferably not less than 90%, more preferably not less than 95%, and particularly preferably not less than 97% in the value measured by $H^1$ NMR. When the hydrogenation ratio is low, the double refractivity and thermal stability of the copolymer are lowered.

The block copolymer can be recovered after the hydrogenation reaction by a method in which the hydrogenation catalyst is removed from the reaction liquid by filtration or centrifugation and the solvent is directly removed by evaporation or a method in which the reaction liquid is poured into a poor solvent of the block copolymer to coagulate the polymer.

White turbid caused by standing for long time under high humid and high temperature condition can be prevented without lowering in the propertied such as transparency, thermal resistivity and mechanical strength by adding a soft polymer having the lowest glass transition temperature of not more than 30° C. to the block copolymer relating to the embodiment.

Concrete examples of the soft polymer include an olefin type soft polymer such as polyethylene, polypropylene, ethylene-α-olefin copolymer and ethylene-propylene-diene copolymer (EPDM); an isobutylene type soft polymer such as polyisobutylene, isobutylene-isoprene rubber and isobutylene-styrene copolymer; a diene type soft polymer such as polybutadiene, polyisoprene, butadiene-styrene random copolymer, isoprene-styrene random copolymer, acrylonitrile-butadiene copolymer, acrylonitrile-butadiene-styrene copolymer, butadiene-styrene block copolymer, styrene-butadiene-styrene block copolymer, isoprene-styrene block copolymer and styrene-isoprene-styrene block copolymer; a silicon-containing soft polymer such as dimethylpolysiloxane and diphenylpolysiloxane; an acryl type soft polymer such as poly(butyl acrylate), poly(butyl methacrylate) and poly(hydroxyethyl methacrylate); an epoxy type soft polymer such as poly(ethylene oxide), poly(propylene oxide) and epichlorohydrin; vinylidene fluoride type soft polymer such as vinylidene fluoride type rubber and tetrafluoroethylene-propylene rubber; and another soft polymer such as natural rubber, polypeptide, protein, polyester type thermoplastic elastomer, vinyl chloride type thermoplastic elastomer and polyamide type thermoplastic elastomer. These soft polymers may be ones having crosslinked structure or ones in which a functional group is introduced by modifying reaction.

Among the above soft polymers, the diene type soft polymer is preferred; particularly a hydrogenated compound formed by hydrogenating the carbon-carbon unsaturated bond of the soft polymer is superior in the rubber elasticity, mechanical strength and dispersibility.

The adding amount of the soft polymer is varied depending on the kind of the polymer and the glass transition temperature and the transparency of the block copolymer are largely lowered when the adding amount is too large so that the block copolymer is made unsuitable for using as the lens. When the adding amount is too small, white turbid is caused sometimes under a high humid and high temperature condition in the product. The adding amount is preferably from 0.01 to 10, more preferably from 0.02 to 5, and particularly preferably from 0.05 to 2, parts by weight to 100 parts by weight of the block copolymer.

As the method for adding the above adding material into the block copolymer to be used in the embodiment to prepare a block copolymer composition, for example, a method in which the block copolymer is melted and kneaded with the adding material by a mixer, biaxial kneader, rollers, brabender or extruder and a method in which the block copolymer and the aging material are dissolved in a suitable solvent and dispersed and then solidified are applicable. When the biaxial kneader is used, the polymer is usually extruded into a strand state and cut by a pelletizer into pellets for use.

Other than the above-described resins, a resin containing norbonene type ring opened (hydrogenated) polymer described in JP-A 2003-73460 can be used for the material of the object lens 7.

An antioxidant may be contained in the above "resin composed of a polymer having alicyclic structure".

As the antioxidant, a phenol type antioxidant, a phosphoric acid type antioxidant, and a sulfur type antioxidant, are employable, and among them the phenol type antioxidant, and particularly an alkyl-substituted phenol type antioxidant are preferable. The coloring and the lowering in the strength of the formed product caused by the heating and the oxidation on the occasion of the formation can be prevented without any decreasing in the transparence and the anti-heating ability.

For the phenol type antioxidant, usually known ones ca be employed. For example, acrylate compounds described in JP-A Nos. 63-179953 and 1-168643 such as 2-t-butyl-6-(3-t-butyl-2-hydroxy-5-methylbenzyl)-4-methylphenyl acrylate and 2,4-di-t-amyl-6-(1-(3,5-di-t-amyl-2-hydroxyphenyl) ethyl)phenyl acrylate; an alkyl-substituted phenol compound such as octadecyl-3-(3,5-di-t-butyl-4-hydroxyphenyl) propionate, 2,2'-methylene-bis(4-methyl-6-t-butylphenol), 1,1,3-tris(2-methyl-4-hydroxy-5-t-butylphenyl)butane, 1,3,5-trimethyl-2,4,6-tris (3,5-di-t-butyl-4-hydroxybenzyl)benzene, tetrakis(methylene-3-(3',5'-di-t-butyl-4'-hydroxyphenylpropionate)methane, namely pentaerythrimethyl-tetrakis(3-(3, 5-di-t-butyl-4-hydroxyphenylpropionate) and triethylene glycol bis-(3-(3-t-butyl-4-hydroxy-5-methylphenyl)-propionate; and a triazine group-containing phenol compound such as 6-(4-hydroxy-3,5-di-t-butylanilino)-2,4-bisoctyl-1,3, 5-triazine, 4-bisoctylthio-1,3,5-triazine and 2-octylthio-4,6-bis-(3,5-di-t-butyl-4-oxyanilino)-1,3,5-triazine are cited.

For the phosphor type antioxidant, ones usually employed in the field of resin industry can be employed without any limitation. For example, monophosphite compounds such as triphenyl phosphate, diphenylisodecyl phosphate, phenylisodecyl phosphate, tris(nonylphenyl) phosphate, tris(dinonylphenyl) phosphate, tris(dinonylphenyl) phosphate, tris (2,4-di-t-butylphenyl) phosphate, and 10-(3,5-di-t-butyl-4-hydroxybenzyl)-9,10-dihydro-9-oxa-10-Phosphaphenanthrene-10-oxide; and diphosphite compounds such as 4,4'-butylidene-bis(3-methyl-6-t-butylphenyl-di-tridecyl phosphate and 4,4'-isopropyridene-bis (phenyl-di-alkyl($C_{12}$ to $C_{15}$) phosphate) are cited. Among them, the monophosphite compounds are preferable and tris (nonylphenyl) phosphate, tris(dinonylphenyl) phosphate and tris(2,4,-di-t-butylphenyl) phosphate are particularly preferable.

As the sulfur type antioxidant, for example, dilauryl 3,3-thiodipropionate, dimyrystyl 3,3'-thiodipropionate, distearyl 3,3-thiodipropionate, laurystearyl 3,3-dithiopropionate, pentaerythrytol-tetrakis-(β-laurylstearyl-thio-propionate and 3,9-bis-(2-dodecylthioethyl)-2,4,8,10-tetrakispiro[5,5]undecane are cited.

These antioxidants may be employed singly or in combination of two or more kinds. The adding amount of the antioxidant is optionally decided within the range in which the object of the invention is not vitiated; it is usually from 0.001 to 5 parts by weight and preferably from 0.01 to 1 part by weight to 100 parts by weight of the polymer having the alicyclic structure.

In the embodiment, a resin composition containing the polymer having the alicyclic structure and at least one selected from the group consisting of (1) a soft polymer, (2) an alcoholic compound and (3) an organic or inorganic filler is employed. By adding such the additives, occurrence of white turbid caused by standing for a long period under a high temperature and high humidity condition can be prevented without degradation in properties such as the transparency, low moisture absorption and mechanical strength. Among the above-mentioned, (1) the soft polymer and (2) the alcoholic compound are excellent in the white turbid preventing effect and the transparency of the resin composition.

(1) The soft polymer is usually a polymer having a Tg of not more than 30° C. When the polymer shows plural Tgs, it is allowed that the lowest Tg is not more than 30° C.

The concrete examples of the soft polymer include an olefin type copolymer such as liquid polyethylene, polypropylene, poly-1-butene, ethylene•α-olefin copolymer, propylene•α-olefin copolymer, ethylene•propylene•diene copolymer (EPDM) and ethylene•propylene•styrene copolymer; an isobutylene type soft polymer such as polyisobutylene, isobutylene•isoprene rubber and isobutylene•styrene copolymer; a diene type soft polymer such as polybutadiene, polyisoprene, butadiene•styrene random copolymer, isoprene•styrene random copolymer, acrylonitrile•butadiene copolymer, acrylonitrile•butadiene•styrene copolymer, butadiene•styrene block copolymer, isoprene•styrene block copolymer, styrene•butadiene•styrene block copolymer, isoprene•styrene block copolymer and styrene•isoprene•styrene block copolymer; a silicon-containing soft polymer such as dimethylpolysiloxane, diphenylpolysiloxane and dihydroxypolysiloxane; a soft polymer composed of a α,β-unsaturated acid such as poly(butyl acrylate), poly(butyl methacrylate), poly(hydroxyethyl methacrylate), polyacrylamide, polyacrylonitrile and butyl acrylate•styrene copolymer; a soft polymer composed of a unsaturated alcohol and amine, an acyl derivative thereof or acetal such as poly(vinyl alcohol), poly(vinyl acetate), poly(vinyl stearate) and cetate•styrene copolymer; an epoxy type soft polymer such as poly(ethylene oxide), poly(propylene oxide) and epichlorohydrine rubber; a fluorine-containing soft polymer such as vinylidene fluoride type rubber and ethylene tetrafluoride•propylene rubber; and another soft polymer such as natural rubber, polypeptide, protein, a polyester type thermoplastic estramer, a vinyl chloride type thermoplastic estramer and a polyamide type thermoplastic estramer.

The soft polymers may be one having a crosslinking structure and one introduced with a functional group by a modification reaction.

In the above soft polymers, the diene type soft polymer is preferable, particularly a hydride compound in which carbon-carbon unsaturated bond is hydride, is superior in the rubber elasticity, mechanical strength, softness and dispersing ability.

(2) The alcoholic compound is a compound having at least one non-phenolic hydroxyl group, and preferably at least one hydroxyl group and at least one ether bond or ester bond. Concrete examples of such the compound include an alcoholic ether and ester compounds such as a poly-valent alcohol for example di or more-valent alcohol, preferably tri or more-valent alcohol, and more preferably poly-valent alcohol having 3 to 8 hydroxyl groups, in which one of the hydroxyl group is etherized or esterized.

As the di- or more-valent alcohol, for example, poly(ethylene glycol), glycerol, trimethylolpropane, pentaerythrytol, diglycerol, triglycerol, dipentaerythrytol, 1,6,7-trihydroxy-2,2-di(hydroxymethyl)-4-oxo-heptane, sorbitol, 2-methyl-1,6,7-trihydroxy-2-hydroxymethyl-4-oxo-heptane, 1,5,6-trihydroxy-3-oxo-hexanepentaerythrytol and tris(2-hydroxyethyl)isocyanurate are cited, and the tri- or more-valent alcohol, particularly having 3 to 8 hydroxyl groups, are preferable. To obtain the alcoholic ester compound, glycerol, diglycerol and triglycerol are preferable, by which alcoholic ester compound containing α,β-diol can be synthesized.

Examples of such the alcoholic compound include a poly-valent alcoholic esterized compound such as glycerol monostearate, glycerol monolaurate, glycerol monobehenate, glycerol monostearate, glycerol distearate, glycerol dilaurate, pentaerythrytol monostearate, pentaerythrytol monolaurate, pentaerythrytol monobehenate, pentaerythrytol distearate, pentaerythrytol dilaurate, pentaerythrytol tristearate and dipentaerythrytol distearate; 3-(octyloxy)-1,2-propanediol, 3-(decyloxy)-1,2-propanediol, 3-(lauryloxy)-1,2-propanediol, 3-(4-nonylphenyloxy)-1,2-propanediol, 1,6-dihydroxy-2,2-di(hydroxymethyl)-7-(4-nonylphenyloxy)-4-oxo-eptane, an alcoholic ether compound obtained by reaction of a condensate of p-nonylphenyl ether with formaldehyde and glycidol, an alcoholic ether compound obtained by reaction of a condensate of p-octylphenyl ether with formaldehyde and crycidol, and an alcoholic ether compound obtained by reaction of a condensate of p-octylphenyl ether with dicyclopentadiene and crycidol are employable.

These poly-valent alcoholic compounds are employed singly or in combination of two or more kinds thereof. The molecular weight of these poly-valent alcoholic compounds is usually from 500 to 2,000, preferably from 800 to 1,500 even though the molecular weight is not specifically limited.

(3) As the organic filler, a usual organic polymer particle or a crosslinked organic polymer particle can be employed. For example, a particle or a crosslinked particle of a polyolefin such as polyethylene and polypropylene; a halogen-containing vinyl polymer such as poly(vinyl chloride) and poly(vinylidene chloride); a polymer derived from a α,β-unsaturated acid such as polyallylate and polymethacrylate; a polymer derived from a unsaturated alcohol such as poly(vinyl alcohol) and poly(vinyl acetate); a polymer derived from poly(ethylene oxide) or bisglycidol ether; an aromatic condensate polymer such as poly(phenylene oxide), polycarbonate and polysulfone; polyurethane; polyamide; polyester; aldehyde; aldehyde•phenol type resin; and natural polymer compound are employable.

As the inorganic filler, for example, a powder of a compound of an element of Group 1 of periodic table such as lithium fluoride and borax (sodium borate hydrate); a compound of an element of Group 2 such as magnesium carbonate, magnesium phosphate, calcium carbonate, strontium titanate and barium carbonate; a compound of an element of Group 4 such as titanium dioxide (titania) and titanium monoxide; a compound of an element Group 6 such as molybdenum dioxide and molybdenum trioxide; a compound of an element of Group 7 such as manganese chloride and manganese acetate; a compound of an element of Groups 8 to 10 such as cobalt chloride and cobalt acetate; a compound of an element of Group 11 such as cuprous iodide; a compound of an element of Group 12 such as zinc oxide and zinc acetate; a compound of an element of Group 13 such as aluminum oxide (alumina), aluminum fluoride and aluminosilicate (alumina silicate, kaolin and kaolinite): a compound of an element of Group 14 such as silicon oxide (silica and silicagel); and a natural mineral such as graphite, carbon and glass; carnallite, kinite, mica (mica and golden mica) and bairose mineral are employable.

Tough the adding amount of the compounds of (1) to (3) is decided by the combination of the polymer having the alicyclic structure and the compound to be added, the glass transition point and the transparency of the composition is largely lowered when the adding amount is too large in general. When the adding amount is too small, white turbid tends to occur under the high temperature and high humid condition so that the composition becomes unsuitable to use for the optical material.

The adding amount is usually from 0.01 to 10, preferably from 0.02 to 5, particularly preferably from 0.05 to 2, parts by weight to 100 parts by weight of the polymer having the alicyclic structure. When the adding amount is too small, the effect for preventing occurrence of the white turbid under the high temperature and high humidity condition cannot be obtained, and when the adding amount is too large, the heat resistivity and the transparency of the molded product are lowered.

Another additive such as a UV absorbent, a light stabilizer, a near infrared absorbent, a colorant such as a dye and a pigment, a slipping agent, a plasticizer, an antistatic agent and a fluorescent whitening agent may be added to "the resin containing the polymer having the alicyclic structure" according to necessity. These additives may be employed singly or in a combination of two or more kinds thereof, and the adding amount is optionally decided within the range in which the object of the invention is not vitiated.

UV absorbents include benzophenone type UV absorbents such as 2,4-dihydroxybenzophenone, 2-hydroxy-4-methoxybenzophenone, 2,2'-dihydroxy-4-methoxybenzophenone, 2,2'-dihydroxy-4,4'-dimethoxybenzophenone, 2-hydroxy-4-methoxy-2'-benzophenone, 2-hydroxy-4-methoxy-5-sulfobenzophenone trihydrate, 2-hydroxy-4-n-octoxybenzophenone, 2,2',4,4'-tetrahydroxybenzophenone, 4-dodecyloxy-2-hydroxybenzophenone and bis(5-benzoyl-4-hydroxy-2-methoxyphenyl)methane; and benzotriazole type UV absorbents such as 2-(2'-hydroxy-5'-methylphenyl)benzotriazole, 2-(2H-benzotriazole-2-il)-4-methyl-6-(3,4,5,6-tetrahydrophthalimidylmethyl)phenol, 2-(2H-benzotriazole-2-il)-4,6-bis(1-methyl-1-phenylethyl)phenol, 2-(2'-hydroxy-3'5'-di-tertiary-butylphenyl)benzotriazole, 2-(2'-hydroxy-3'-tertiary-butyl-5'-methylphenyl)-5-chlorobenzotriazole, 2-(2'-hydroxy-5'-tertiary-octylphenyl)benzotriazole, 2-(2'-hydroxy-3'5'-di-tertiary-amylphenyl)benzotriazole, 2-[2'-hydroxy-3'-(3",4",5",6"-tetrahydrophthalimidomethyl)-5'-methylphenyl]benzotriazole and 2,2'-methylenebis[4-(1,1,3,3-tetramethylbutyl)-6-(2H-benzotriazle-2-il)phenol].

Among them, preferable are 2-(2'-hydroxy-5'-methylphenyl)benzotriazole, 2-(2H-benzotriazole-2-il)-4-methyl-6-(3, 4,5,6-tetrahydrophthalimidylmethyl)phenol and 2-(2H-benzotriazole-2-il)-4,6-bis(1-methyl-1-phenylethyl)phenol, with respect to such as heat resistance and low volatility.

Light fastness stabilizers include benzophenone type light fastness stabilizers, benzotriazole type light fastness stabilizers and hindered amine type light fastness stabilizers, and, in this invention, preferably utilized are hindered amine type light fastness stabilizers, with respect to transparency and an anti-coloring property of a lens.

Among hindered amine type light fastness stabilizers (hereinafter, abbreviated as a HALS), those having a polystyrene equivalent Mn, measured by means of GPC employing THF as a solvent, of preferably 1000-10000, more preferably 2000-5000 and most preferably 2800-3800. When Mn is excessively small, a predetermined amount may not be blended due to evaporation at the time of blending said HALS in a polymer by thermal fusion kneading, or foams and silver streaks may generate at the time of thermal fusion molding in the ejection molding, resulting in decrease of manufacturing stability.

Further, volatile gases may be generated from a lens when the lens is used for a long period keeping an on-state of a lamp. On the contrary, when Mn is excessively large, the dispersibility of HALS in a block copolymer is decreased to decrease transparency of a lens which results in deterioration of the improvement effect of light fastness. Therefore, in this invention, obtained can be lenses exhibiting excellent manufacturing stability, low gas generation and transparency by setting Mn of HALS in the above range.

Specific examples of such a HALS include high molecular weight HALS in which a plural number of piperidine rings are bonded via a triazine skeleton such as N,N',N",N'"-tetrakis-[4,6-bis-{butyl-(N-methyl-2,2,6,6-tetramethylpiperidine-4-il)amino}-triazine-2-il]-4,7-diazadecane-1,10-diamine, a polycondensation compound of dibutylamine, 1,3,5-triazine and N,N'-bis(2,2,6,6-tetramethyl-4-piperidyl)butylamine, poly[{(1,1,3,3-tetramethylbutyl)amino-1,3,5-triazine-2,4-diil}{(2,2,6,6-tetramethyl-4-piperidyl)imino}hexamethylene{(2,2,6,6-tetramethyl-4-piperidyl)imino)], a polycondensation compound of 1,6-hexadiamine-N,N'-bis(2,2,6,6-tetramethyl-4-piperidyl) and morphorine-2, 4,6-trichloro-1,3,5-triazine and poly[(6-morphorino-s-triazine-2,4-diil)(2,2,6,6-tetramethyl-4-piperidyl)imino]-hexamethylene[((2,2,6,6-tetramethyl-4-piperidyl)imino); high molecular weight HALS in which a piperidine rings are bonded via a ester bonding such as a polymerization compound of dimethylsuccinate and 4-hydroxy-2,2,6,6-tetramethyl-1-piperidineethanol, a mixed esterified compound of 1,2,3,4-butanetetracarboxylic acid, 1,2,2,6,6-pentamethyl-4-piperidinol and 3,9-bis(2-hydroxy-1,1-dimethyl)-2,4,8,10-tetraoxasupiro[5,5]undecane.

Among them, preferred are polymers having Mn of 2000-5000, such as a polycondensation compound of dibutylamine, 1,3,5-triazine and N,N'-bis(2,2,6,6-tetramethyl-4-piperidyl)butylamine; poly[{1,1,3,3-tetramethylbutyl)amino-1,3,5-triazie-2,4-diil}{(2,2,6,6-tetramethyl-4-piperidyl)imino}hexamethylene{(2,2,6,6-tetramethyl-4-piperidyl)imino}], a polymerization compound of dimethylsuccinate and 4-hydroxy-2,2,6,6-tetramethyl-1-piperidineethanol.

The blending amount of UV absorbent and HALS described above in a block copolymer according to this invention is preferably 0.01-20 weight parts, more preferably 0.02-15 weight parts and most preferably 0.05-10 weight perts based on 100 weight parts of the polymer compound. The improvement effect of light fastness may not be obtained sufficiently resulting in coloring in such as the case of long period outdoor use, when the addition amount is excessively small. While, when the blending amount of HALS is excessively large, a part of the HALS may be converted to a gas to be generated, or dispersibility of the HALS may be decreased, resulting in decrease of transparency of a lens.

The "resin containing the polymer having the alicyclic structure" can be obtained by suitably mixing the foregoing raw materials. The mixing method is not specifically limited as long as the additives can be satisfactorily dispersed in the hydrocarbon type polymer by the method. For example, a method in which the resin is kneaded in a molten form by a mixer, double-axial kneader, rollers, brabender or extruder and a method in which the materials are dissolved in a suitable solvent and dispersed and solidified. When the double-axial kneader is employed, the molten mixture is usually extruded in a form of stick and cut into a suitable length by a strand cutter to form pellets for employing as the molding material.

EXAMPLES

In the examples, several kinds of sample of optical element for optical pickup apparatus were prepared, and the samples were subjected to observation on the appearance shape and to measurement of spherical aberration and astigmatism.

Example 1

(1) Preparation of Sample

ZEONEX 340R, manufactured by Nippon Zeon Corp., having a glass transition temperature of 122° C. was used as the above described "resin containing the polymer having the alicyclic structure". The glass transition temperature was the value measured by the differential scanning calorimetric analysis (DSC) at a temperature raising rate of 10° C./min according to JIS K7121. The resin was molded by ejecting into a designated metal mold and the molded product was stood and cooled at room temperature. Thus several molded products assuming an optical pickup lens for HD-DVD were prepared.

Each of the molded samples has diffractive structure on the entire optically functional surface thereof and the numerical aperture (NA) of the HD-DVD was 0.65. The molded samples each has a lens portion and a flange portion rounding the circumference and the maximum length in the optical axis direction (the maximum thickness of the lens portion) was 1.2 mm and the maximum length in the perpendicular direction to the optical axis (the maximum length of the distance between the both end of the flange portion) was 4 mm. These molded products were subjected to a heat treatment with a relative humidity of 1% RH or lower under the condition given in the following Table 1 using an oven or hydro-thermostat to prepare Samples 1-1 to 1-13.

(2) Observation of Appearance Shape

The difference of the shape of the samples 1-1 to 1-13 and the objective designed shape was visually observed by using a microscope. The observation results of Samples 1-1 to 1-13 are shown in Table 1.

(3) Measurement of Spherical Aberration and Astigmatism

The spherical aberration and astigmatism of each of Samples 1-1 to 1-13 were measured at a wavelength of 650 nm by using an interference meter capable of digital analyzing. Measuring results of Samples 1-1 to 1-13 are shown in Table 1. In Table 1, the measuring results of the spherical aberration and astigmatism were evaluated according to the following norms.

Not less than 0.02: Unacceptable for practical use

Not less than 0.01 and less than 0.02: Practically usable but on not preferable level.

Not less than 0.005 and less than 0.01: Practically usable

Less than 0.005: Suitably usable on preferable level

TABLE 1

| Sample | Annealing condition | | | Lens thickness (mm) | Difference from the designed objective shape | Spherical aberration | Astigmatism | Remarks |
| --- | --- | --- | --- | --- | --- | --- | --- | --- |
| | Temperature (° C.) | Difference from Tg (° C.) | Time (hours) | | | | | |
| 1-1 | 110 | −12 | 168 | 1.2 | None | 0.005 | 0.007 | Inv. |
| 1-2 | 110 | −12 | 18 | 1.2 | None | 0.006 | 0.008 | Inv. |
| 1-3 | 105 | −17 | 168 | 1.2 | None | 0.006 | 0.009 | Inv. |
| 1-4 | 105 | −17 | 18 | 1.2 | None | 0.007 | 0.01 | Inv. |
| 1-5 | 100 | −22 | 168 | 1.2 | None | 0.002 | 0.004 | Inv. |
| 1-6 | 100 | −22 | 18 | 1.2 | None | 0.003 | 0.005 | Inv. |
| 1-7 | 95 | −27 | 168 | 1.2 | None | 0.002 | 0.005 | Inv. |
| 1-8 | 95 | −27 | 18 | 1.2 | None | 0.005 | 0.007 | Inv. |
| 1-9 | 75 | −47 | 168 | 1.2 | None | 0.02 | 0.015 | Comp. |
| 1-10 | 75 | −47 | 18 | 1.2 | None | 0.03 | 0.02 | Comp. |
| 1-11 | 120 | −2 | 168 | 1.2 | Large | — | — | Comp. |
| 1-12 | 120 | −2 | 18 | 1.2 | Large | — | — | Comp. |
| 1-13 | 110 | −12 | 10 | 1.2 | None | 0.02 | 0.025 | Comp. |

Inv.: Inventive,
Comp.: Comparative

As is shown in Table 1, the measurement of optical aberration was impossible when the treating temperature was a temperature lower by 2° C. than the glass transition temperature (122° C.), in this example 122° C.−2° C.=120° C., because the deformation is too large. Moreover, sufficient relaxation was not obtained and optical aberration was on unusable level in the case of the treatment time of less than 15 hours even when the treatment temperature was within the range of lower by 10 to 30° C. than the glass transition temperature of the resin measured by the differential scanning calorimetric analysis at a temperature raising rate of 10° C./min (Sample 1-13).

When the treatment temperature was largely lower (122° C.−47° C.=75° C.), the designed shape was attained but the spherical aberration and astigmatism were not insufficient.

Besides, Samples 1-5 to 1-8 treated at a temperature lower by 20 to 30° C. than the glass transition temperature gave the best results.

Example 2

(1) Preparation of Sample

ZEONEX 340R, manufactured by Nippon Zeon Corp., having a glass transition temperature of 122° C. was used as the above described "resin containing the polymer having the alicyclic structure". The glass transition temperature was the value measured by the differential scanning calorimetric analysis (DSC) at a temperature raising rate of 10° C./min according to JIS K7121. The resin was molded by ejecting into a designated metal mold and the molded product was stood and cooled at room temperature. Thus several molded products assuming a BD compatible optical pickup lens were prepared.

Each of the molded samples has diffraction structure on the entire optically functional surface thereof and the numerical aperture (NA) of the BD was 0.85. The molded samples each has a lens portion and a flange portion rounding the circumference and the maximum length in the optical axis direction (the maximum thickness of the lens portion) was 1.8 mm and the maximum length in the perpendicular direction to the optical axis (the maximum length of the distance between the both end of the flange portion) was 4.5 mm. These molded samples were subjected to a heat treatment with a relative humidity of 1% RH or lower under the condition given in the following Table 2 using an oven or hydro-thermostat to prepare Samples 2-1 to 2-13.

(2) Observation of Appearance Shape

Samples 2-1 to 2-13 were evaluated in the same manner as in Example 1. The results are listed in Table 2.

(3) Measurement of Spherical Aberration and Astigmatism

The spherical aberration and astigmatism of each of Samples 2-1 to 2-13 were measured in the same manner as in Example 1. The results are listed in Table 2.

Besides, Samples 2-1 and 2-2 treated at a temperature lower by 10 to 15° C. than the glass transition temperature gave the best results.

Example 3

(1) Preparation of Sample

In Example 3, molded products of Example 1 were subjected to a wet-heat treatment under the condition given in the following Table 3 using an oven or hydro-thermostat to prepare Samples 1-5a to 1-5e.

(2) Observation of Appearance Shape

Samples 1-5a to 1-5e were evaluated in the same manner as in Example 1. The results are listed with Sample 1-5 in Table 3.

(3) Measurement of Spherical Aberration and Astigmatism

The spherical aberration and astigmatism of each of Samples 1-5a to 1-5e were measured in the same manner as in Example 1. The results are listed with Sample 1-5 in Table 3.

(4) Acceleration of Annealing Process and Cloudiness Appearance

The acceleration of annealing process and cloudiness appearance of each of Samples 1-5a to 1-5e was evaluated as

TABLE 2

| Sample | Annealing condition | | | Lens thickness (mm) | Difference from the designed objective shape | Spherical aberration | Astigmatism | Remarks |
|---|---|---|---|---|---|---|---|---|
| | Temperature (° C.) | Difference from Tg (° C.) | Time (hours) | | | | | |
| 2-1 | 110 | −12 | 168 | 1.8 | None | 0.002 | 0.002 | Inv. |
| 2-2 | 110 | −12 | 18 | 1.8 | None | 0.004 | 0.003 | Inv. |
| 2-3 | 105 | −17 | 168 | 1.8 | None | 0.003 | 0.003 | Inv. |
| 2-4 | 105 | −17 | 18 | 1.8 | None | 0.006 | 0.005 | Inv. |
| 2-5 | 100 | −22 | 168 | 1.8 | None | 0.006 | 0.005 | Inv. |
| 2-6 | 100 | −22 | 18 | 1.8 | None | 0.01 | 0.006 | Inv. |
| 2-7 | 95 | −27 | 168 | 1.8 | None | 0.008 | 0.005 | Inv. |
| 2-8 | 95 | −27 | 18 | 1.8 | None | 0.01 | 0.008 | Inv. |
| 2-9 | 75 | −47 | 168 | 1.8 | None | 0.02 | 0.008 | Comp. |
| 2-10 | 75 | −47 | 18 | 1.8 | None | 0.03 | 0.01 | Comp. |
| 2-11 | 120 | −2 | 168 | 1.8 | Large | — | — | Comp. |
| 2-12 | 120 | −2 | 18 | 1.8 | Large | — | — | Comp. |
| 2-13 | 110 | −12 | 10 | 1.8 | None | 0.02 | 0.01 | Comp. |

Inv.: Inventive,
Comp.: Comparative

As is shown in Table 2, the measurement of optical aberration was impossible when the treating temperature was a temperature lower by 2° C. than the glass transition temperature (122° C.), in this example 122° C.−2° C.=120° C., because the deformation was too large. Moreover, sufficient relaxation was not obtained and optical aberration was on unusable level in the case of the treatment time of less than 15 hours (Sample 2-13) even when the treatment temperature was within the range of lower by 10 to 30° C. than the glass transition temperature of the resin measured by the differential scanning calorimetric analysis at a temperature raising rate of 10° C./min.

When the treatment temperature was largely lower (122° C.−37° C.=85° C.), the designed shape was attained but the spherical aberration and astigmatism were not insufficient.

shown in Table 3. In Table 3, the acceleration of annealing process was evaluated according to the following norms with compared to Sample 1-5.

A: Suitably usable on preferable level with shorter annealing time than that of Sample 1-5

B: Practically usable with shorter annealing time than that of Sample 1-5

B: Practically usable with the same annealing time as Sample 1-5

In Table 3, the crack appearance was evaluated according to the following norms.

A: Almost no clacks appear in the sample.

B: Cloudiness appears as the sample is practically usable

C: Cloudiness appears as the sample is practically usable but on not preferable level.

TABLE 3

| Sample | Annealing condition | | | | Lens thickness (mm) | Difference from the designed objective shape | Remarks |
|---|---|---|---|---|---|---|---|
| | Temperature (° C.) | Difference from Tg (° C.) | Relative humidity (% RH) | Time (hours) | | | |
| 1-5 | 100 | −22 | 1 or lower | 168 | 1.2 | None | Inv. |
| 1-5a | 100 | −22 | 35 | 168 | 1.2 | None | Inv. |
| 1-5b | 100 | −22 | 45 | 168 | 1.2 | None | Inv. |
| 1-5c | 100 | −22 | 60 | 168 | 1.2 | None | Inv. |
| 1-5d | 100 | −22 | 75 | 168 | 1.2 | None | Inv. |
| 1-5e | 100 | −22 | 85 | 168 | 1.2 | None | Inv. |

| Sample | Spherical aberration | Astigmatism | Acceleration of annealing | Cloudiness appearance | Remarks |
|---|---|---|---|---|---|
| 1-5 | 0.002 | 0.004 | — | A | Inv. |
| 1-5a | 0.002 | 0.003 | C | A | Inv. |
| 1-5b | 0.002 | 0.003 | B | A | Inv. |
| 1-5c | 0.002 | 0.001 | A | A | Inv. |
| 1-5d | 0.005 | 0.003 | A | B | Inv. |
| 1-5e | 0.008 | 0.008 | A | C | Inv. |

Inv.: Inventive,
Comp.: Comparative

By treating the molded product by wet-heat treatment, an optical element with the same property to that treated by heat treatment can be obtained with shorter annealing time than that of Sample 1-5. As is shown in Table 3, relative humidity at a temperature of the wet-heat treatment is preferably 40 to 80%, and more preferably 55 to 65%. When the value of relative humidity exceeds the lower limit of the preferable range, an optical element with the same property as that treated by heat treatment can be obtained with shorter treatment time than that treated by heat treatment. When the value of relative humidity is lowered than the upper limit of the preferable range, it restrains appearance of cloudiness in the samples caused by phenomena including fine cracks appeared due to high humidity, and it can provide an optical element with high transmittance.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An optical element comprising:
an element body comprising a resin containing a polymer having an alicyclic structure,
treated by one of heat treatment and wet-heat treatment for 15 hours or longer at a temperature lower by 10° C. to 30° C. than a glass transition temperature of the resin after being formed by injecting the resin in a mold, the glass transition temperature of the resin being measured by differential-scanning-calorimetry-method at heating rate 10° C./min on the basis of JIS K7121,
having a length along an optical axis of the optical element in a range of 0.5 to 3 mm, and
having a length in a perpendicular direction to the optical axis in a range of 3 to 5 mm.

2. The optical element of claim 1,
wherein the resin containing the polymer having the alicyclic structure comprises polymer block [A] containing a repeating unit [1] represented by a formula (1), and polymer block [B] containing the repeating unit [1] represented by the formula (1) and a repeating unit [2] represented by the formula (2), and/or a repeating unit [3] represented by the formula (3), and the block polymers satisfy a relationship of a>b, where a is a mol fraction (mol %) of the repeating unit [1] in the polymer block [A] and b is a mol fraction (mol %) of the repeating unit [1] in the polymer block [B]:

Formula 1 where in the formula, $R^1$ represents a hydrogen atom or an alkyl group having a carbon number of 1-20, $R^2$-$R^{11}$ each independently represent a hydrogen atom, an alkyl group having a carbon number of 1-20, hydroxyl group, an alkoxy group having a carbon number of 1-20 or a halogen group, $$\begin{array}{c}\phantom{x}\\ \left[\text{CH}_2-\text{CH}-\text{CH}_2-\text{CH}_2\right]\\ \phantom{xx}|\\ \phantom{xxx}R^{12}\end{array}$$

Formula 2 where in the formula, $R^{12}$ represents a hydrogen atom or a alkyl group having a carbon number of 1-20, Formula 3 where in the formula, $R^{13}$ and $R^{14}$ each independently represent a hydrogen atom or a alkyl group having a carbon number of 1-20.

3. The optical element of claim 1,
wherein the element body has a length along the optical axis in a range of 0.7 to 1.5 mm, and
is treated by one of the heat treatment and the wet-heat treatment for 15 hours or longer at a temperature lower by 20-30° C. than the glass transition temperature.

4. The optical element of claim 1,
wherein the element body has a length along the optical axis in a range of 1.6 to 2.5 mm, and
is treated by one of the heat treatment and the wet-heat treatment for 15 hours or longer at a temperature lower by 10-15° C. than the glass transition temperature.

5. The optical element of claim 1,
wherein the element body is treated by one of the heat treatment and the wet-heat treatment for 150 hours or longer.

6. The optical element of claim 1,
wherein the element body is treated by the wet-heat treatment, and
a relative humidity at a temperature of the wet-heat treatment is 40 to 80%.

7. The optical element of claim 6,
wherein the relative humidity is 55 to 65%.

8. The optical element of claim 1,
wherein the optical element is an optical element for use in an optical pickup apparatus.

9. The optical element of claim 8,
wherein the optical element is an objective lens for use in an optical pickup apparatus.

10. A method of producing an optical element, comprising
molding a resin containing a polymer having an alicyclic structure to form an element body having a length along an optical axis of the optical element in a range of 0.5 to 3 mm and a length in a perpendicular direction to the optical axis in a range of 3 to 5 mm by injecting the resin in a mold; and thereafter
treating the element body by one of heat treatment and wet-heat treatment for 15 hours or longer at a temperature lower by 10° C. to 30° C. than a glass transition temperature of the resin, the glass transition temperature of the resin being measured by differential-scanning-calorimetry-method at heating rate 10° C./min on the basis of JIS K7121.

11. The method of claim 10,
wherein the element body has a length along an optical axis of the optical element in a range of 0.7 to 1.5 mm, and
the element body is treated by one of the heat treatment and the wet-heat treatment for 15 hours or longer at a temperature lower by 20-30° C. than the glass transition temperature.

12. The method of claim 10,
wherein the element body has a length along an optical axis of the optical element in a range of 1.6 to 2.5 mm, and
the element body is treated by one of the heat treatment and the wet-heat treatment for 15 hours or longer at a temperature lower by 10-15° C. than the glass transition temperature.

13. The method of claim 10,
wherein the element body is treated by one of the heat treatment and the wet-heat treatment for 150 hours or longer.

14. The method of claim 10,
wherein the element body is treated by the wet-heat treatment, and
a relative humidity at a temperature of the wet-heat treatment is 40 to 80%.

15. The method of claim 14,
wherein the relative humidity is 55 to 60%.

* * * * *